United States Patent [19]
Fujiwara

[11] Patent Number: 5,212,694
[45] Date of Patent: May 18, 1993

[54] IMPROPER WRITING PREVENTION CIRCUIT AND A MEMORY DEVICE AND A DATA PROCESSING DEVICE WHICH INCLUDE THE CIRCUIT

[75] Inventor: Yasuhide Fujiwara, Suwa, Japan

[73] Assignee: Seiko Epson Corporation, Tokyo, Japan

[21] Appl. No.: 630,854

[22] Filed: Dec. 20, 1990

[30] Foreign Application Priority Data

Dec. 20, 1989 [JP] Japan .................................. 1-330603
Oct. 31, 1990 [JP] Japan .................................. 2-294162

[51] Int. Cl.$^5$ ........................................... G11C 29/00
[52] U.S. Cl. ..................................... 371/21.1; 365/201
[58] Field of Search ............... 365/201, 200, 228, 229; 371/21.1, 21.4, 21.2, 21.5, 10.1, 67.1, 28

[56] References Cited

U.S. PATENT DOCUMENTS

| | | | |
|---|---|---|---|
| 3,751,649 | 8/1973 | Hart, Jr. ...................... | 235/153 AC |
| 4,775,857 | 10/1988 | Staggs ...................... | 340/715 |
| 4,811,294 | 3/1989 | Kobayashi et al. ................ | 365/189 |
| 5,053,698 | 10/1991 | Ueda ............................ | 324/158 R |
| 5,109,382 | 4/1992 | Fukunaka .......................... | 371/21.1 |

FOREIGN PATENT DOCUMENTS 0264893 4/1988 Japan .

Primary Examiner—Robert W. Beausoliel, Jr.
Assistant Examiner—Phung My Chung
Attorney, Agent, or Firm—Spensley Horn Jubas & Lubitz

[57] ABSTRACT

An improper writing prevention circuit having a source voltage detection circuit which detects the value of a source voltage and generates a first control signal to be sent to a state selection terminal of a memory device, a reference register in which a predetermined reference data is stored in advance, a first writing test register to and from which data can be written and read for receiving data to be referred to through a data bus, a validity check circuit for writing test which determines consistency of the reference data with the data to be referred to and generates a second control signal on the basis of the above determination, and a state selection circuit which generates a state selection signal to be applied to the state selection terminal in accordance with the first and second control signals. Improper writing operation to the memory can be prevented by changing its state from an active state to a non-active state by the state selection signal.

24 Claims, 3 Drawing Sheets

IMPROPER WRITING PREVENTION CIRCUIT AND A MEMORY DEVICE AND A DATA PROCESSING DEVICE WHICH INCLUDE THE CIRCUIT

BACKGROUND OF THE INVENTION

1. Field of the Invention

The present invention relates to a memory device and also to a data processing device, each having a RAM whose state is transferred from active to non-active in response to a change in voltage of a power source. In particular, the present invention pertains to an improper writing prevention circuit which prohibits false or improper writing to a RAM due to malfunction of a MPU (microprocessor unit) which may occur as a result of an unstable voltage condition of the power source.

2. Prior Art

RAMs have been widely used as semiconductor memory for word processors, personal computers, home computer game machines etc., one known type being the SRAM (Static RAM). The typical RAM, which is known as a back-up type RAM, is provided with an auxiliary power unit which has a secondary battery to retain memory contents in the RAM after the main power is shut off.

FIG. 3 is a block diagram which shows a conventional semiconductor memory device 10 having a back-up type RAM (12). The semiconductor memory device 10 shown in this figure is comprised of a typical back-up type RAM 12, a source-voltage detection circuit 14 and a power source changeover switch 16. The back-up type RAM 12 has address terminals A0–A7 for receiving address signals via an address bus from a control block 20 having a microprocessor unit 22. The RAM 12 also has input-output terminals D0–D7 (data terminals) for input of data transferred via a data bus from the control block 20 during a writing operation mode and for output of data via the data bus to the control block 20 during a reading operation mode, a first chip-enable or chip selection terminal CEI of the MPU 20 for determining the state of the memory chip (RAM) 12, a read-write terminal R1 for receiving instructions of data reading and writing, a power terminal (high voltage side terminal) $V_{DD}$ connected to a power source whose voltage is usually 5V, a ground terminal $V_{ss}$ connected to a point at ground voltage (low voltage), and a second chip-enable terminal CE2 for determining the state of the RAM, i.e. an active state ready for writing and/or reading, or in static state (non active state) for holding stored data therein.

The source voltage detection circuit 14 functions such that it compares source voltage $V_{DD}$ with a threshold voltage $V_{th}$ (approx. 3.3V–4.5V), and, in response to a drop by a value $V_x$ of the source voltage $V_{DD}$ lower than the threshold voltage Vth due to the cutoff of the source voltage $V_{DD}$, generates a power source changeover signal S1 to thereby determine the starting point at which the power source is changed to the back-up power supply. The power source changeover switch 16 connects the power (high voltage) terminal $V_{DD}$ of RAM 12 selectively to the source voltage $V_{DD}$ or the secondary battery B (approx. 3V) for back-up operation in accordance with the power source changeover signal $S_1$.

For example, if the source voltage supply is cut off by opening a power switch SW, the source voltage detection circuit 14 detects a drop of the voltage value supplied thereto and generates the power source changeover signal $S_1$. In response to this signal, the power source changeover switch 16 is shifted from the power terminal $V_{DD}$ to the side of the back-up secondary battery B. At the same time, the state of the RAM is transferred to the static state in which the data are maintained as they are in a reduced power-consumption mode. During the static state of the RAM, the power source changeover signal $S_1$ maintains a high level signal at second chip-enable terminal CE2, so that data writing or reading are prevented.

The back-up type RAM 12 is changed to the static state not only when the power supply is switched from the main power source to the auxiliary power source due to the shutoff of the main power, but also during a transient change in the source vol&age immediately after the main power is placed into service by closing the power switch SW. The change in the state of the RAM 12 to the static state also occurs in the event of an unstable condition of the power source which may be caused, for example, by instantaneous or short black out, during the normal operation period.

Usually, a writing operation to the RAM 12 is performed under the control of the microprocessor 22 wherein the threshold voltage $V_{th}$ the source voltage detection circuit 14 must be exactly the same as a guaranteed lowest voltage $V_{min}$ for operation of the microprocessor 22. However, it is extremely difficult to manufacture a microprocessor so that it has exactly the same value of threshold voltage $V_{th}$ as that of the guaranteed lowest voltage $V_{min}$ for operation mainly because all semiconductor chips (microprocessors) cannot be manufactured to exhibit exactly the same voltage $V_{min}$. Also, although the source voltage detection circuit 14 is required to detect the voltage $V_x$ accurately, the detected value usually involves a relatively large error component.

The above problems can give rise to a number of drawbacks. For example, under the condition that the threshold voltage $V_{th}$ is higher than the guaranteed voltage for operation $V_{min}$ that the voltage detection value $V_x$ is in the range between the threshold voltage Vth and the guaranteed lowest voltage for operation $V_{min}$, even where the microprocessor 22 is ready for normal service, writing into the RAM 12 is impossible since the state of the RAM 12 will have been transferred to the static state. On the other hand, under the condition that the threshold voltage $V_{th}$ is lower than the guaranteed lowest voltage for operation $V_{min}$ and that the detected voltage $V_x$ is in the range of the value between the guaranteed lowest voltage for operation $V_{min}$ and the threshold voltage Vth , although the microprocessor 22 is out of the guaranteed operational condition, RAM 12 is in an active sate so that false data can be undesirably accepted by the RAM 12 when a malfunction occurs in the microprocessor 22.

Thus, in case the detected voltage of the source voltage detection circuit 14 of the RAM 12 is lower than the guaranteed lowest voltage for operation $V_{min}$ of the microprocessor 22, and RAM 12 remains in its active state, the probability of malfunction of the microprocessor 22 is very high, and therefore, if a writing malfunction occurs, RAM 12 is allowed to be written improperly. The improper writing can destroy stored data and cause a decrease in the reliability of the data processing unit.

In case the detected voltage is far below the guaranteed lowest voltage for operation $V_{min}$ to the extent that it reaches a value where action stops, obviously, the microprocessor 22 cannot be driven into service. When the detected voltage is in the range between the guaranteed lowest voltage for operation $V_{min}$ and the above value where action stops, the probability of malfunction goes to a high level from a low level. The above-mentioned probability density becomes higher as the difference between the lowest value $V_{min}$ and the value action stops becomes smaller, whereas this density becomes lower as the aforesaid difference becomes larger. Thus writing malfunctions occur in accordance with the probability of malfunction of the microprocessor.

OBJECT AND SUMMARY OF THE INVENTION

A main object of this invention is to overcome the above problems by providing a memory device with enhanced system reliability which can be obtained by a function such that, in case a detected voltage value is lower than the guaranteed lowest voltage for operation of a microprocessor and writing is required by the microprocessor, the RAM side checks whether such requirement is proper or not, and then if the requirement is judged to be improper, the RAM is controlled to change to a static state so as to ignore the improper writing requirement, thereby the probability of false writing to the RAM can be decreased.

For achieving the above and other objects, in one aspect of the present invention, there is provided a memory device which comprises a read only reference register to store a prescribed reference data beforehand, a first writing test register for storing data received from the microprocessor via a data bus, a validity check means to determine consistency of the reference data stored in the reference register with the data to be referred to stored in the first register, and a state selection means for generating a state selection signal to be sent to a chip-enable terminal in response to both the first control signal from the source voltage detection circuit and the second control signal from the validity check means.

In addition to the first writing test register, a second writing test register may be provided for storing the data received from the microprocessor via the data bus, wherein the data from the second register is inverted followed by being judged by the above validity check means whether the reference data stored in the reference register is consistent with the inverted data.

In another aspect of the present invention, there is provided a memory device which has only a first writing test register instead of the above-mentioned reference register and first writing test register. The memory device also has a decoder for decoding the data stored in the first writing test register instead of the above validity check means. Typically, a RAM is of the semiconductor type, which can be manufactured in the form of a monolithic structure. Alternatively, the overall memory device including the RAM and the improper writing prevention circuit can be in the form of a monolithic structure.

In still another aspect of the present invention, there is provided a data processing unit equipped with a microprocessor having the function that a prescribed data is written in the first register before actual data writing operation begins and that data different from the prescribed data is written after the actual data writing operation is finished.

In case that a detected voltage $V_x$ ( this voltage is actually equal to the source voltage) is in the range between the guaranteed lowest voltage for operation $V_{min}$ in of the microprocessor and the threshold voltage $V_{th}$ of the source voltage detection circuit, notwithstanding that the state of microprocessor is out of guaranteed condition, the RAM remains in the active state in which writing or reading is allowed. Thus, like the prior memory unit, there is some possibility of a writing malfunction of a microprocessor. In order to judge, at the RAM side, whether a writing action is proper or not, the microprocessor is programmed to output data which is the same as the reference data before the output of data to be written. That is, when the microprocessor sends the data, which is the same as the reference data, to the first register for a writing test, the validity check means judges the consistency of the prescribed reference data with the data to be referred to which is read from the first register.

In case the microprocessor is in a normal condition, the above-mentioned two kinds of data should be the same. Owing to this judgment, the RAM remains in the active state by the state selection signal to be supplied to the chip-enable terminal of RAM, and then normal writing is performed. After this normal writing operation, the microprocessor sends data, which is different from the reference data, to the first register for a writing test. On the other hand, in case the writing operation is improper due to malfunction of the microprocessor, the data to be referred to which should be the same as the reference data and should be sent before the writing action, is not sent. Hence, in the first register, data different from the reference data remains. Therefore, the validity check means judges whether or not the data are inconsistent and then the state of the RAM is forced from active to static in order to maintain stored data, and the writing instructions are ignored, in other words the improper writing to the RAM is not performed.

As explained above, the judgment of writing malfunction of the microprocessor due to instability of the source power, at the RAM side, makes it possible to prevent the data destruction effectively. At the RAM side, in addition to a malfunction of the microprocessor, even if the microprocessor is in a normal condition, the data to be referred to which is received at the RAM side, might be changed due to an unstable state of the data bus caused by instability of the power source. In this case, the writing to the RAM is also stopped.

As described above, instead of providing a reference register for reading, the decoder can be provided for reading the prescribed data and for judging the above consistency. Namely, data saved in the register for a writing test is decoded and judged as to whether it is proper or not by the decoder. Where the data saved in the register is judged to be improper, the RAM is forced into static state and thus improper data writing is prohibited. Obviously, not only the reference data stored in the read only register, but also the control signal from the source voltage detection circuit can be decoded using the decoder to generate the state selection signal to be transferred to the chip-enable terminal of the RAM.

DESCRIPTION OF THE PREFERRED EMBODIMENTS

The invention will now be explained in detail with reference to the attached drawings.

Figure 1:
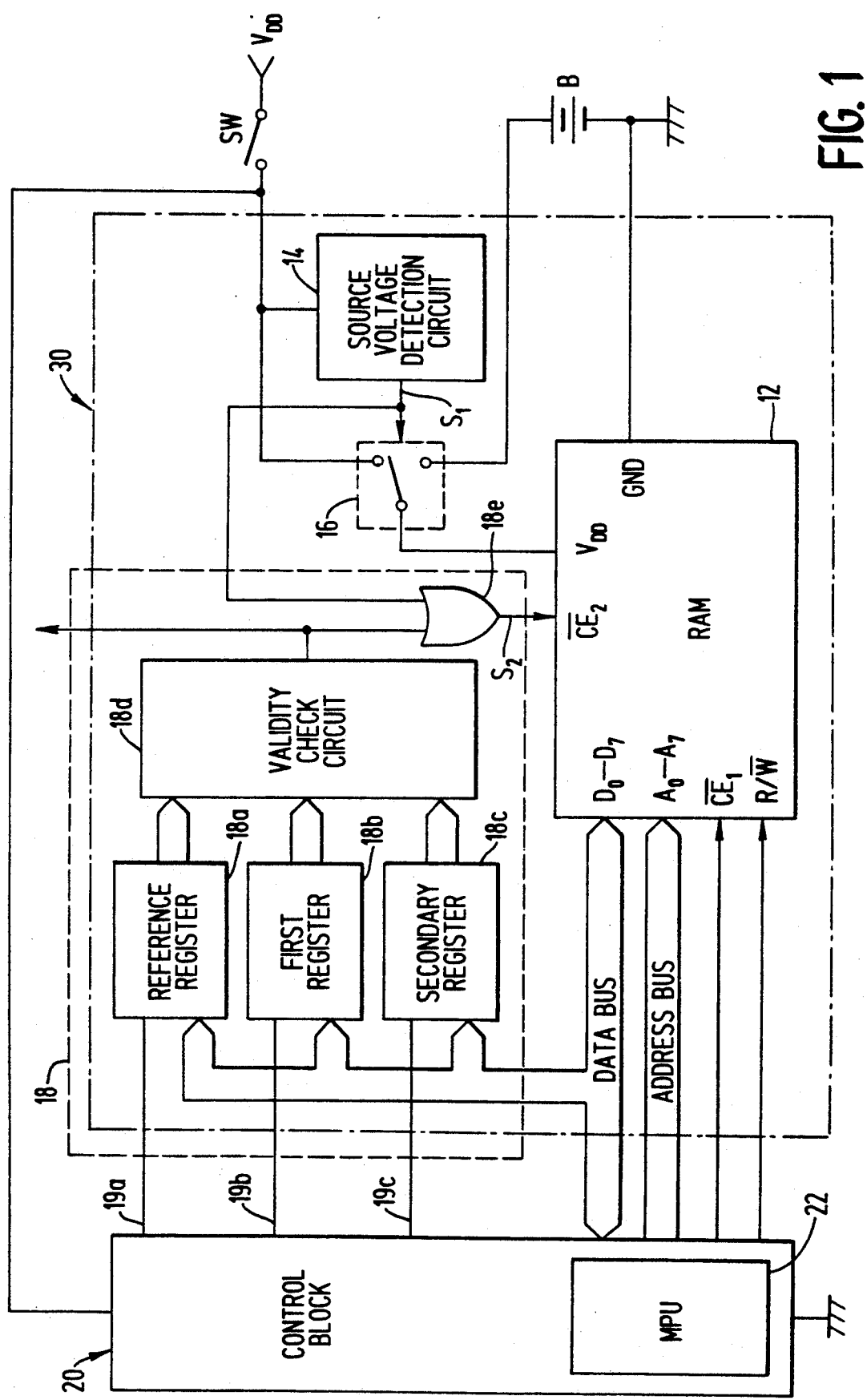
FIG. 1 is a block diagram of a data processing device including a memory unit having an improper writing prevention circuit according to an embodiment of the invention.
Figure 3:
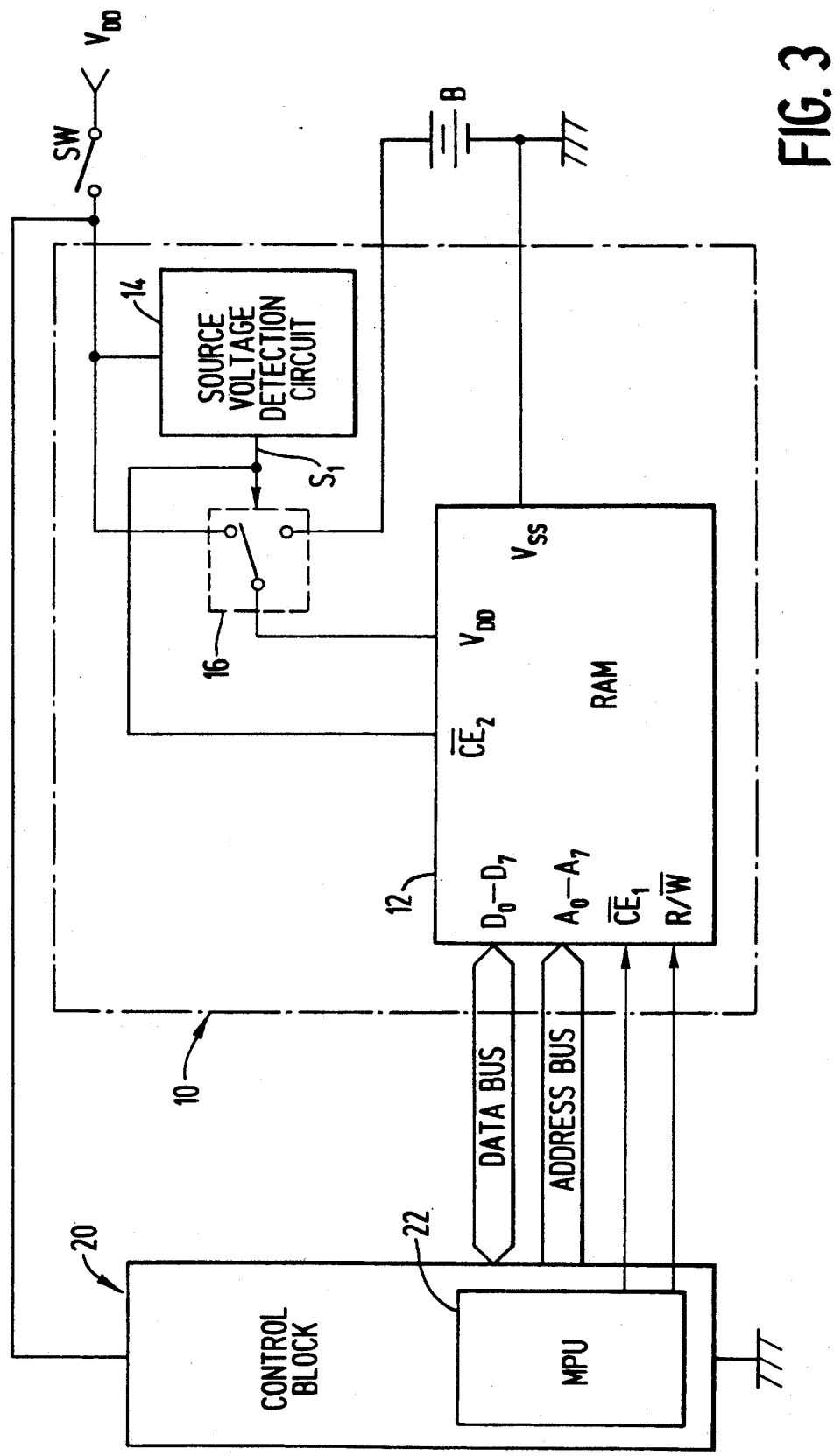
FIG. 3 is a block diagram of a data processing device including a memory unit having a back-up type RAM according to the prior art.

FIG. 1 shows a block diagram of a first embodiment of the present invention. The components shown in FIG. 1 corresponding to those of FIG. 3 are designated by the same reference numerals, and a description of such components will not be repeated in the following.

The device shown in FIG. 1 includes a memory unit 30 composed of a conventional back-up type RAM 12, a source voltage detection circuit 14, a power source changeover switch 16 and an improper writing prevention circuit 18.

The back-up type RAM 12 has address terminals A0--A7, input-output terminals (data terminals) $D_0$--$D_7$ a first chip-enable terminal (chip selection terminal) $\overline{CE1}$ utilized for the MPU 20 to identify memory chips, a read/write terminal R/W for receiving data writing and reading instructions, a power terminal (high voltage terminal) $V_{DD}$ which is connected to a source voltage of 5V, a ground terminal ($V_{ss}$, which is connected to a ground voltage (low voltage), and a second chip-enable terminal $\overline{CE2}$ utilized to distinguish a driven condition (active state) from a non-driven condition (non-active state) of RAM 12.

The source voltage detection circuit 14 compares the source voltage $V_{DD}$ with a threshold voltage Vth (approx. 3.3-4.5V). When the detected value $V_x$ of the source voltage VDD becomes lower than the threshold voltage $V_{th}$, circuit 14 generates a power source changeover signal $S_1$ to thereby determine the starting point of power back-up required by a voltage drop due to cutoff of the main power or source voltage $V_{DD}$. The power source changeover signal $S_1$ is supplied to power source changeover switch 16 and to improper writing prevention circuit 18.

Power source changeover switch 16 is utilized to selectively connect the power terminal of RAM 12 to the main power source voltage $V_{DD}$ or the secondary battery B (voltage of about 3 V). This selection of the power sources is carried out in accordance with the power source changeover signal $S_1$.

The improper writing prevention circuit 18 is constituted by registers 18a, 18b and 18c, a validity check circuit 18d, and a state selection circuit 18e. The register 18a is a read only register (of 8 bits, for example), or reference register, operating as a read only memory, in which reference data appearing on a data bus is stored only once when register 18a receives a register selection signal 19a from a control block 20. After the reference data has been stored, this register is used as a read-only reference register. Typically, reference register 18a receives and stores therein predetermined reference data, for example (10101010)$_2$, beforehand. The register 18b is a write and read register (e.g. 8 bits) which functions as a first register for writing tests. This register receives the data to be referred to (e.g. (10101010)$_2$) in a writing operation mode from the microprocessor 22 in response to a register selection signal 19b. The remaining register 18c is a write and read register (e.g. 8 bits) which functions as a secondary register for writing tests. This register receives inverted data (e.g. (01010101)$_2$) in the writing operation mode from the microprocessor 22 in response to a register selection signal 19c.

The validity check circuit 18d judges the consistency of the reference data read from the reference register 18a with the data to be referred to read from the first register 18b for a writing test. At the same time, the circuit 18d inverts the inverted data read from secondary register 18c for a writing test and judges the consistency of the re-inverted data with the reference data. If the re-inverted data is not consistent with the reference data, a non-acceptable signal (which is logically high) is generated. Otherwise, an acceptable signal (which is logically low) is generated.

The state selection circuit 18e is an OR circuit to generate a state selection signal S2 in accordance with the source power changeover signal $S_1$ and the above-mentioned consistency signal. More specifically, where the source power changeover signal $S_1$ is at a logically low level (that is, the source voltage is not below the threshold voltage) and the acceptable value of the consistency signal (which is logically low) is generated, the state selection signal S2 is at a logically low level, and in this case the RAM 12 is set to be in the driven condition, or active state. When the source power changeover signal $S_1$ is in a logically low level and the nonacceptable value of the consistency signal (which is logically high) is generated, the state selection signal is logically high, and therefore the RAM 12 is set to be in the non-driven condition, or non-active state.

In the present embodiment, the reference register 18a has the reference data (10101010)$_2$ stored therein in advance. In advance of an actual writing operation, the microprocessor 22 acts to write into the registers 18b and 18c the data to be referred to (in this embodiment, (10101010)$_2$) and the inverted data (in this embodiment, (01010101)$_2$), respectively.

The detected voltage $V_x$ of the source detection circuit 14 is usually higher than the threshold voltage $V_{th}$, for example, when the auxiliary unit B is selected, when a transient voltage change appears by putting the main power source in service (that is, when closing the power switch SW), or when a short period black-out occurs during normal use. The detected voltage can drop below the guaranteed lowest voltage $V_{min}$ for operation of the microprocessor 22. In this case, the power source changeover signal S1 is at a low level and thus the power source changeover switch 16 is in a position to select the main power source voltage. Since the source voltage for microprocessor 22 is below the guaranteed lowest voltage $V_{min}$ for operation, there is a high possibility of microprocessor malfunction.

If microprocessor 22 performs the writing operation normally, it writes in the first register 18b with the data to be referred to (10101010)$_2$, and writes in the secondary register 18c with the inverted data (01010101)$_2$. Then, the reference data (10101010)$_2$ from the reference register 18a, the data to be referred to (10101010)$_2$ from the first register 18b, and the inverted data (01010101)$_2$ from the secondary register 18c, respectively, are read out to the validity check circuit 18d. Validity check circuit 18d judges the consistency of the reference data (10101010)$_2$ from register 18a with the data to be referred to (10101010)$_2$ from register 18b and also judges the consistency of the reference data $(10101010)_2$ from register 18a with the re-inverted data $(10101010)_2$ obtained by inverting the inverted data from register 18c.

When microprocessor 22 operates properly, the consistencies among the above data are obtained so long as the data are properly transferred through their respective data paths, so that the validity check circuit generates the acceptable signal of a low level. Thus, the OR circuit of state selection circuit 18e sends out the state selection signal S2 of low level to the second chip-enable terminal $\overline{CE2}$ of the RAM 12. According to this low level signal, the state of the RAM 12 is maintained in a driven condition in which data writing can be allowed. After the writing operation by the microprocessor 22 is completed, ineffective data is stored in the registers 18b and 18c (the ineffective data being different from the reference data or the inverted data).

In contrast, if an improper writing operation by the microprocessor 22 takes place, either the writing test data $(10101010)_2$ or the inverted writing test data $(01010101)_2$ is not sent out, so the ineffective data which has been stored in the first and secondary registers remain as they are. Therefore, the validity check circuit 18d generates the non-acceptable signal of high level, in response to which the OR circuit of state selection circuit 18e sends the state selection signal S2 of high level to the secondary chip-enable terminal $\overline{CE2}$ of RAM 12, by which RAM 12 is shifted in state to the non-active state. Hence, RAM 12 is prevented from being improperly written to.

A writing malfunction of microprocessor 22 happens with a certain probability. Even when the microprocessor 22 operates properly, there is a possibility that data acquire erroneous components when they are being transferred through the data paths under the condition that the source power voltage is unstable. As explained above, since the possibility that improper writing to the RAM is requested can be reduced by a certain probability at the RAM side, it is possible to protect important stored data from destruction.

There are possibilities, although they are of extremely low probability, that the same data as the data to be referred to is accidentally written in the register 18a and that the same data as the inverted data is accidentally written in the register 18b. The solution to this problem is to increase the number of the set of the registers so as to reduce the probability that all of the registers are improperly written at one time.

Figure 2:
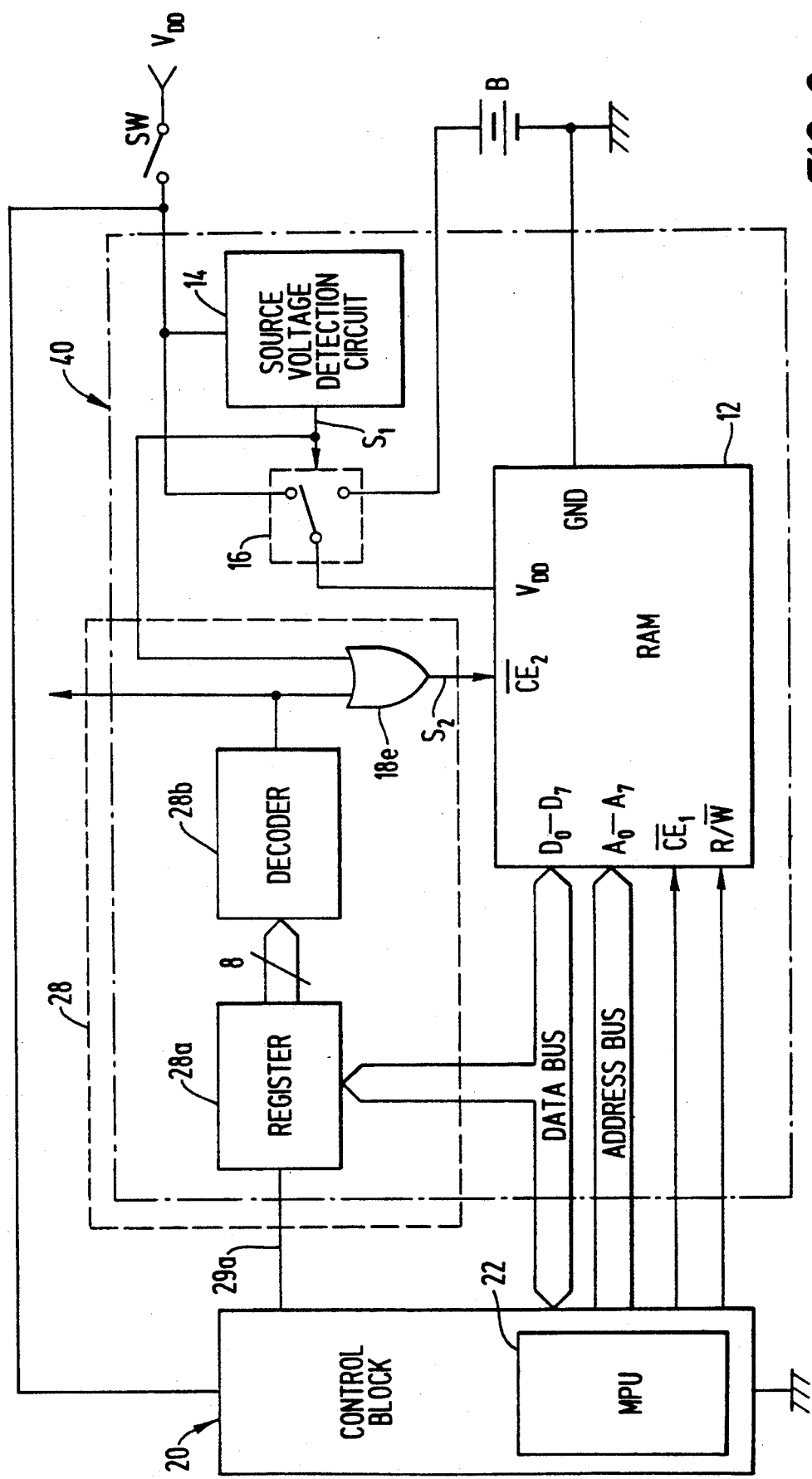
FIG. 2 is a block diagram of a data processing device including a memory unit having an improper writing prevention circuit according to another embodiment of the invention.

FIG. 2 is a block diagram which shows a second embodiment of the present invention. The components corresponding to those of FIG. 1 are designated by the same numerals, so that these components will not again be described below.

An improper writing prevention circuit 28 in a memory unit 40 of the embodiment of FIG. 2 is constituted by a register for test 28a, a decoder 28b and a state selection circuit 18e. The register for test 28a is a write and read register (e.g. 8 bit) which receives, in accordance with a register selection signal 29a from a microprocessor 22, a test data (e.g. $(10101010)_2$) in a writing operation mode. The decoder 28b decodes data from the register for test 28a, and generates an acceptable signal of low level if the data is judged to be proper, whereas it generates a non-acceptable signal of high level if the data is judged to be improper. The state selection circuit 18e is the same as that of the first embodiment of the present invention.

In this embodiment, the decoder 28b performs the functions of reference register 18a and validity check circuit 18d of the first embodiment described above. Hence, the structure of the circuit is simplified compared to that of FIG. 1. In case that the source voltage of the microprocessor 22 is out of the operation guaranteed range, in advance of the actual writing operation, test data $(10101010)_2$ is written in the test register 28a. Then the decoder 28b decodes the data $(10101010)_2$ to generate the acceptable signal. Thus, even if the source voltage of the microprocessor 22 is out of the operation guaranteed range, the state of RAM 12 is kept activated so long as the writing operation proceeds properly. After the writing operation is completed, ineffective data is written in the register 28a.

On the other hand, if a writing malfunction occurs, the test data $(10101010)_2$ is not generated by the microprocessor 22, so that the ineffective data remains in the register 28a. Then the decoder 28b generates the non-acceptable signal of high level. In response to the non-acceptable signal, the state selection signal S2 becomes logically high and the state of RAM 12 is changed to its non-active state. Thus, the writing of false data due to the writing malfunction is avoided.

The above decoder 28b is provided with the same number of input bits (8 bits) as that of output bits of the register 28a. Alternatively, a decoder may be utilized which is provided with nine input bits, the sum of the number of eight bits of the register 28a and one bit for the power source changeover signal, whereby the above state selection circuit of OR gate 18e can be eliminated and the structure of the circuitry can be further simplified.

The improper writing prevention circuit which has the source voltage detection circuit can be manufactured as a monolithic semiconductor integrated circuit. It is also possible that the whole circuitry including memory devices is manufactured as a monolithic semiconductor integrated circuit. Any combinations of the respective circuits to be formed in a single integrated circuit can be selected. It is also possible to provide the integrated circuit having the improper writing prevention circuit or having the memory unit with the prevention circuit in the form of a part of an IC card or the like.

As is clear from the above description, the present invention is characterized by an improper writing prevention circuit wherein, before writing in to the RAM, the validity of data generated by the microprocessor is determined at the RAM side, the writing operation by the microprocessor is judged on the basis of the validity of the data whether it is proper or not, and then in case the writing operation is judged to be improper, the RAM is forced to a non-active state in order to protect the stored data. Thus, the following advantages can be obtained according to the present invention:

1. In the case that the source voltage becomes low and the microprocessor is out of the operation guaranteed range, while the RAM is in an active state, which condition can be observed, for example, when the power source is in an unstable condition, improper writing operations caused by the above condition can be detected at the RAM side which, in turn, is forced to a non-active state. Therefore, improper writing to the RAM can be avoided effectively, and the probability that the data stored in the RAM are destroyed can be drastically reduced.

2. According to the manufacturing technology of semiconductor integrated circuits, the accuracy of voltage detection cannot be enhanced to the extent that the proper operation of the integrated circuit is assured. It is also impossible to eliminate deviations among respective products concerning the threshold voltage of the source power detection circuit and the guaranteed lowest voltage for operation of the microprocessor. The improper writing prevention circuit according to the present invention makes it possible to prevent improper writing into the RAM, and therefore the reliability of memory units and data processing units can be enhanced.

This application relates to subject matter disclosed in Japanese Application numbers JP 330603/89 filed Dec. 20, 1989, and 294162/90, filed Oct. 31, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An improper writing prevention circuit for use with a device having means for supplying a source voltage and memory means adapted to receive the source voltage, the source voltage having a value, the memory means including a state selection terminal, the circuit comprising:
    source voltage detection means for detecting the value of the source voltage and for generating a first control signal having a value which is dependant on the value of th source voltage;
    receiving means for receiving predetermined data;
    storage means, including a test register, for receiving reference data and for storing the received reference data;
    validity check means, operably connected to said receiving means and to said storage means, for performing a writing test which determines whether or not the reference data is consistent with the predetermined data and for generating a second control signal having a value which is dependent on the determination; and
    state selection means for receiving said first and second control signals from said source voltage detection means and said validity check means, respectively, and for producing a state selection signal to be applied to the state selection terminal oft the memory means in accordance with the values of said first and second control signals.

2. An improper writing prevention circuit according to claim 1, wherein said the improper writing prevention circuit is formed as a monolithic semiconductor integrated circuit.

3. A memory device, comprising:
    memory means having at least an active state in which data can be written to and read from said memory means, and a non-active state in which data stored in said memory means is maintained, said memory means including a state selection terminal for selecting one of the states;
    source voltage detection means for detecting a value of a source voltage and for generating a first control signal having a value which is dependent on the value of the source voltage;
    storage means, including a test register, for receiving and storing reference data and for receiving and storing predetermined data, the reference data being stored in said test register;
    a data bus operably connected to said memory means and said storage means;
    validity check means, operably connected to said storage means, for performing a writing test which determines whether or not the reference data is consistent with the predetermined data, and for generating a second control signal having a value which is dependent on the determination; and
    state selection means for receiving said first an second control signals from said source voltage detection means and said validity check means, respectively, and for producing a state selection signal to be applied to said state selection terminal in accordance with the values of said first and second control signals.

4. A memory device as define in claim 3, wherein said the memory means is formed as a monolithic semiconductor integrated circuit.

5. A memory device according to claim 4, wherein said the monolithic semiconductor integrated circuit and at least one of said source voltage detection means, said storage means, said data bus, said validity check means and said state selection means are in the form of an IC card.

6. A memory device according to claim 3 formed as a monolithic semiconductor integrated circuit.

7. A memory device according to claim 6, wherein said monolithic semiconductor integrated circuit is in the form of an IC card.

8. A memory device according to claim 3, wherein said test register defines a first test register, the device further comprising:
    a second test register adapted to receive and store data from said data bus,
    wherein said validity check means inverts data read out from said second test register and determines whether the inverted data is consistent with the predetermined data.

9. A memory device as defined in claim 8, wherein said memory means is formed as a monolithic semiconductor integrated circuit.

10. A memory device according to claim 9, wherein said monolithic semiconductor integrated circuit at least one of said source voltage detection means, said storage means, said data bus, said validity check means and said stat selection means are in the form of an IC card.

11. A memory device according to claim 8 formed as a monolithic semiconductor integrated circuit.

12. A memory device according to claim 11, wherein said monolithic semiconductor integrated circuit is in the form of an IC card.

13. A memory device, comprising:
    memory means having at least an active state in which data can be written to and read from said memory means, and a non-active state in which data stored in said memory means is maintained, said memory means including a state selection terminal for selecting one of the sates;

a data bu adapted to supply data to said memory means;

source voltage detection means for detecting a value of a source voltage and for generating a first control signal having a value which is dependent on the value of the source voltage; and an improper writing prevention circuit including a read and write test register adapted to receive data from said data bus, and state selection signal generating means for receiving said first control signal and data from said test register, for analyzing the data from said test register, and for generating a state selection signal to be applied to said sate selection terminal in a accordance with the value of said first control signal.

14. A memory device as defined in claim 13, wherein said memory means is formed as a monolithic semiconductor integrated circuit.

15. A memory device according to claim 14, wherein said monolithic semiconductor integrated circuit and at least one of said source voltage detection means, said data bus, and said improper writing prevention circuit are in the form of an IC card.

16. A memory device according to claim 13 formed as a monolithic semiconductor integrated circuit.

17. A memory device according to claim 16, wherein said monolithic semiconductor integrated circuit is in the form of an IC card.

18. A memory device as defined in claim 13, wherein said state selection signal generating means comprises a decoder adapted to decode the data stored in said test register and to produce a second control signal having a value which is dependent on the decoding, and sate selection control means for generating the state selection signal in accordance with the values of said first and second control signals.

19. A memory device as defined in claim 18, wherein said memory means is formed as a monolithic semiconductor integrated circuit.

20. A memory device as defined in claim 19, wherein said monolithic semiconductor integrated circuit and at least one of said source voltage detection means, said data bus, and said improper writing detection circuit are in the form of an IC card.

21. A memory device according to claim 18 formed as a monolithic semiconductor integrated circuit.

22. A memory device according to claim 21, wherein said monolithic semiconductor integrated circuit is in he form of an IC card.

23. A data processing device, comprising:

memory means having at least an active state in which data can be written to and read from said memory means, and a non-active state in which data stored in said memory means is maintained, said memory means including a state selection terminal for selecting one of the sates;

source voltage detection means for detecting a value of a source voltage and for generating a first control signal having a value which is dependent on the value of the source voltage;

storage means, including a test register, for receiving and storing reference data and for receiving and storing predetermined data, the reference data being stored in said test register;

a data bus operably connected to said memory means and said storage means;

validity check means, operably connected to said storage means, for performing a writing test which determines whether or not the reference data is consistent with the predetermined data, and for generating a second control signal having a value which is dependent on the determination;

state selection means for receiving said first an second control signals from said source voltage detection means and said validity check means, respectively, and for producing a state selection signal to be applied to said state selection terminal in accordance with the values of said first and second control signals; and a control block including microprocessor means for writing reference data into said first test register prior to an actual writing operation.

24. A data processing device, comprising:

memory means having at least an active state in which data can be written to and read from said memory means, and a non-active state in which data stored in said memory means is maintained, said memory means including a state selection terminal for selecting one of the sates;

a data bus adapted to supply data to said memory means;

source voltage detection means for detecting a value of a source voltage and for generating a first control signal having a value which is dep3ndent on the value of the source voltage;

an improper writing prevention circuit including a read and write test register adapted to receive data from said data bus, a decoder adapted to decode the data stored in said test register and to produce a second control signal having a value which is dependent on the decoding, and state selection control means for generating the state selection signal to be applied to said state selection terminal in accordance with the values of said first and second control signals; and a control block including microprocessor means for writing predetermined data into said read and write test register prior to an actual writing operation.

* * * * *